Patented Aug. 7, 1951

2,562,888

UNITED STATES PATENT OFFICE 2,562,888

PREPARATION OF A SILICA-METAL OXIDE GRANULAR CATALYST

George R. Bond, Jr., Paulsboro, N. J., assignor to Houdry Process Corporation, Wilmington, Del., a corporation of Delaware No Drawing. Application December 26, 1947, Serial No. 794,129

9 Claims. (Cl. 252—453)

The present invention relates to the preparation of synthetic plural oxide catalysts and is particularly directed to a new and improved method for the preparation of active siliceous catalysts of the type, for example, employed in hydrocarbon conversion processes.

Catalysts comprising synthetic composites of silica with an oxide of a metal such as alumina, zirconia, magnesia, and composites of silica with one or more of these or other metal oxides and additional metal oxides stated to serve as promoters, have heretofore been proposed for use in hydrocarbon conversion processes. In commercial operations, particularly in cracking of higher boiling hydrocarbons for the production of gasoline, catalysts comprising silica and alumina have been most generally employed.

A number of diverse methods are disclosed in the patent literature for the production of such synthetic siliceous catalysts, including incorporation or deposition of the other metal oxide or oxides in or on a separately prepared siliceous gel, as well as methods of co-precipitation of solutions of the siliceous compound and compounds of the desired metals. In any event the product formed is usually gelatinous, ranging from true hydrogels to gelatinous precipitates or mixtures of hydrogel and gelatinous precipitate. Because of the gelatinous character of these products, their handling presents complications. Liquid, except for that separating by syneresis, cannot be readily removed therefrom, and difficulties are therefore encountered in washing and purifying these products, particularly in their wet hydrogel state. The synerised hydrogel still contains considerable quantities of water which is required to be removed for production of the desired dry gel product. The formation of the dried gel or the hydrogel into bodies of desired sizes and shapes, as is required for catalysts used in certain hydrocarbon conversion systems, is not readily accomplished by simple methods such as extrusion and therefore special procedures and apparatus for forming, casting, or molding must generally be employed. These expensive operations, it will be seen, considerably increase the cost of synthetic catalyst manufacture.

I have devised a comparatively simple, efficient, and more economical method for preparing active synthetic catalysts. In accordance with my invention, compounds yielding the desired catalytic components are reacted in high concentrations and in the absence of large quantities of liquid medium to produce a non-gelatinous precipitate. The obtained product, which is of a granular nature, can be readily further processed as required, as by washing or other purification treatment, since the wash liquids are readily separated and removed. Because of the comparatively low liquid content of the obtained granular precipitate, it can be dried in a relatively short time, and without necessitating the precise precautions otherwise required in drying products of the gel type to avoid detrimental changes in structure and accompanying impairment of catalyst activity. The granular product, moreover, can be directly formed into agglomerated bodies of desired size and shape by simple and rapid methods, such as ordinary casting or extrusion.

Catalysts prepared by this procedure likewise have been found to exhibit certain other novel features rendering them of distinct advantage in use as compared with catalysts of similar composition prepared in the usual manner via the gel stage. Among these advantages are decreased coke and gas formation for a given conversion of higher boiling hydrocarbons to gasoline. Without being bound to any particular theory as to this favorable behavior of the present catalysts, it is believed that the same may be due in part to the pronounced heterogeneity of the catalyst surface as opposed to the greater homogeneity of catalysts of the gel type; discrete particles of $SiO_2$ and $Al_2O_3$, etc., lying side by side instead of being more intimately associated, possibly as a definite aluminum silicate, as in the gel type. By virtue of this heterogeneity, innumerable active spots may develop on the surface of the catalyst, capable of undergoing momentary large temperature fluctuations favorable to the breaking down of the hydrocabon molecules to fractions lying in the gasoline boiling range while minimizing the more severe cracking to gas and coke which is characteristic of gel type catalysts, believed to be due to the greater adsorptivity of the latter by virtue of their extensive capillary structure.

In order to obtain the desired reaction products of the invention, it is necessary that the product concentration of the components forming the ultimate catalyst, in the liquid reaction medium, be not less than about 150 grams of such components per liter of total reaction mass. At the lowest indicated product concentration, the reaction mass will be at least a highly viscous liquid and with increasing product concentration may range from a stiff paste to an almost dry appearing mass.

Catalysts of high activity level are frequently obtained at higher product concentrations, as in excess of 250 grams of catalytic oxides per liter of total reaction mass.

To supply the silica component of the ultimate catalyst any silicate having appreciable solubility in aqueous media may be employed, including crystalline silicates, such as sodium metasilicate, commercial solutions of water-glass of various $SiO_2/Na_2O$ ratios, or solutions of alkali metal metasilicates.

The other metal oxide or oxides of the ultimate catalyst may be any of those known or heretofore employed in catalysts of this type, including non-reducible metal oxides and particularly the oxides of amphoteric metals; such as alumina, zirconia, magnesia, beryllia, etc., or combinations of these. In the reaction with the silicate to effect precipitation of the desired granular product, compounds of the indicated metals should be employed which have some significant solubility in water. If either the silicate or the compound of the other metal is in solution or contains associated or adhering water adsorbed or absorbed therein or chemically bound water, including water of crystallization, which can be dissociated therefrom under the reaction conditions, no further addition of liquid to serve as a reaction medium will be necessary. On the other hand, if water or other liquid is not released or provided by the reactants employed, it will be necessary to supply a small amount of water to facilitate good mixing and to further the reaction. In such instance, the water may be supplied by previously dissolving or wetting any one or more of the reactants, or the water may be added to the admixture of the reactants.

With the drier or more highly concentrated compositions employed in the reaction to effect precipitation, where migrations of reacting ions may be quite slow, more intimate contact between the reactants, can be obtained by stirring and grinding these together, as in a mortar, edge-runner, or ballmill.

The same considerations as to the ratio of silica to the other metal oxides that apply to the known siliceous gel type catalysts are also generally applicable in the case of the catalysts of the invention; the silica component of the plural oxide catalyst predominating. Thus in the preparation of silica-alumina catalysts, weight ratios of from about 95/5 to 55/45 silica to alumina may be employed to produce catalysts of acceptable physical and performance properties.

The reactants should be selected on the reaction conditions adjusted so that reaction takes place under conditions maintaining a pH of from about 2 to 10 and preferably about 4 to 9. Although highly active catalysts can be prepared by the described method at pH below 4, the solubility of amphoteric metal oxides in this range requires more precise handling. The non-siliceous reactant should advantageously be selected so as to provide easily removable anions.

The desired pH range is obtained by employing an alkali metal silicate furnishing alakali in excess of that required for neutralization of acidic anions provided by the non-siliceous reactant and adding acids or acidic salts to the reaction.

The reaction may be carried out at room temperature or at an elevated temperature; addition of compounds of low pH to alkaline silicate furnishes heat in the reaction as a result of neutralization.

EXAMPLE I

A solution of commercial water glass of 1.40 specific gravity having the approximate composition $Na_2O$—3.33 $SiO_2$ ("N-Brand") was thoroughly admixed mechanically with powdered sodium aluminate to furnish a theoretical weight ratio of 90 parts $SiO_2$ to 10 parts $Al_2O_3$ (1262 parts of water glass solution to 77 parts of sodium aluminate).

Concentrated sulfuric acid (95%) was diluted with water furnishing a mixture containing 216 parts of $H_2SO_4$ and 276 parts $H_2O$, which acid mixture was added to the previous mixture of silicate and aluminate and the entire slurry whipped for several minutes. The slurry had a product concentration of 310 grams $SiO_2$ and $Al_2O_3$ per liter and was of 3 pH.

The slurry was warm due to exothermic reaction and showed the presence of some unprecipitated aluminum ion. The slurry was diluted with 1000 parts by weight of water to reduce viscosity and permit ready stirring and uniform admixture of ammonium hydroxide added to bring the pH of the slurry to 4.5. The ammonia treated slurry filtered readily and extremely rapidly, and left a residual granular precipitate.

The obtained precipitate was washed with distilled water until free of sulfate then washed with ammonium chloride solution a number of times and again with water until chloride free. The wash solution separated quite easily and rapidly.

A portion of the washed product was dried (¼) and reground and admixed with the remainder of the wet mass to form a mass of moldable consistency. This mass was cast into pellets of 4 mm. size and the pellets dried.

Drying of the pellets was accomplished without appreciable shrinkage in contrast to the high degree of shrinkage characteristic of a gel. The dried pellets were quite firm and had an apparent density of 0.38. (Measured as kgm. per liter of packed pellets.)

It will be noted from the above example that once reaction in high product concentration has been substantially completed, the reaction mass may be diluted by addition of liquid, if desired, without adversely affecting the granular nature of the precipitate.

EXAMPLE II

The same general procedure was followed as in the preceding example to obtain a theoretical weight ratio of $90SiO_2/10Al_2O_3$, but the reactants admixed in concentrations furnishing 333 grams $SiO_2.Al_2O_3$ per liter of slurry. The "N-Brand" silicate was ground together with the powdered sodium aluminate in proportions of 631 parts by weight silicate solution to 38.5 parts of the aluminate. An aqueous solution of sulfuric acid and ammonium sulfate was then prepared containing per liter of solution 482 grams $H_2SO_4$ and 218 grams ammonium sulfate, $(NH_4)_2SO_4$, dissolved therein. An amount of the thus prepared acid solution furnishing the $SO_4$ equivalent of the $Na_2O$ content of the mix, was added to the ground mass. Stirring was continued during reaction, which resulted in the formation of a grainy paste of 7 pH.

After removal of water by filtering and purification of the product as in the preceding example, a portion of the wet, washed and filtered product was extruded into pellets and dried. No appreciable shrinkage occurred on drying.

Another portion of the washed product was thoroughly mixed and filtered to remove excess water then about one-third of the mass dried in an oven. The dried product was ground to 100 mesh and remixed with the wet portion, and the obtained mix cast into pellets. The resulting pellets were quite hard and had an apparent density of 0.42.

EXAMPLE III

An aqueous hydrochloric acid solution containing 131 parts by weight HCl and 369 parts H$_2$O was admixed with 95 parts crystalline aluminum chloride, AlCl$_3$.6H$_2$O (furnishing 20 parts Al$_2$O$_3$), and with 64 parts ammonium chloride. The mixture was stirred with heating and additional water added to effect complete solution of the chlorides.

The acid chloride solution was then added to 637 parts sodium metasilicate (furnishing 180 parts SiO$_2$) and the batch ground in a mortar until reaction was complete. Product concentration of SiO$_2$.Al$_2$O$_3$=182 grams/liter; pH of batch=7. The reaction mass was filtered easily, leaving a grainy precipitate.

The obtained precipitate was washed with distilled water until substantially free of SO$_4$ ions, then with 5% ammonium chloride solution. Odor of ammonia was noted at the start of the ammonium chloride wash indicating that some of the metasilicate had not reacted. The mass extruded easily without much shrinkage on drying.

After the final wash, the mass was filtered to remove excess liquid and cast directly into pellets and dried. The dried pellets were fairly hard and had an apparent density of 0.40.

EXAMPLE IV

Commercial water glass solution ("N-Brand") and sodium aluminate were ground together in a mortar and an aqueous solution of ammonium chloride and hydrochloric acid added thereto, to furnish Cl ions equivalent to the Na$_2$O content; giving the following proportions by weight:

| | |
|---|---|
| Water glass solution | 634.0 |
| Sodium aluminate | 38.5 |
| HCl | 61.5 |
| NH$_4$Cl | 30.2 |

Water sufficient to give a product concentration of 286 grams Al$_2$O$_3$.SiO$_2$ per liter
SiO$_2$/Al$_2$O$_3$ weight ratio — 9/1
pH of batch — 7.5

Thorough mixing was continued until visible reaction ceased, and the obtained precipitate was filtered with suction. The liquid separated rapidly.

The precipitate was washed with water and ammonium chloride solution as in the previous examples. The product could be extruded easily and dried without much shrinkage.

The entire washed batch was thoroughly mixed, filtered to remove excess wash liquids, cast into pellets and dried as in the previous example. The dried pellets had an apparent density of 0.39.

Following the same general procedure as in the above examples, other silica-alumina cast pellets were prepared at various pH and different product concentrations, including:

EXAMPLE V

A batch of 276 grams per liter SiO$_2$.Al$_2$O$_3$ of 9.5 pH and 9/1 silica to alumina ratio prepared from commercial silicate solution ("N-Brand"), sodium aluminate and ammonium sulfate.

EXAMPLE VI

One of 273 grams per liter and 9 pH prepared from the same reactants with a 75/25 silica to alumina ratio.

No difficulty was encountered in treating, washing, or pelleting any of these batches.

The catalytic activity of pelleted catalyst prepared as described in the foregoing examples was tested by the "CAT-A" method described by J. Alexander and H. G. Shimp in National Petroleum News, Technical Section, August 2, 1944; beginning at page R537. In accordance with the described method, a light East Texas gas oil is contacted with the catalyst at a temperature of approximately 800° F. under superatmospheric pressure and at a liquid space rate of 1.5 (volume charge/volume of catalyst/per hour) for a ten minute operation period. The volume of gasoline of 410° F. cut point is measured and expressed as a percentage of the volume of oil charged, thereby designating the characteristic activity of the catalyst. In addition, the quantity of carbonaceous deposit formed in the catalyst is also usually measured and expressed in terms of weight percent of charge, and the specific gravity and weight percent of gas produced is also determined.

Previous to testing, the pellets were calcined to stabilized activity by treating the same in 95% air and 5% steam (volumes) at 1400° F. for 10 hours. The average activity of typical catalysts of the invention is shown in the following tabulation.

To determine their steam stability, certain of the catalysts were also treated in 100% steam for four hours at 1250° F. and then tested for cracking activity with results shown in the table below:

Table 1

| Catalyst | Heat Treat | CAT-A Yields | | | | |
|---|---|---|---|---|---|---|
| | | Gasoline | Coke | Gas | Gas Grav. | Gaso./coke Ratio |
| | | Volume per cent | Weight per cent | Weight per cent | | |
| Example I | (a) | 39.4 | 1.7 | 4.9 | 1.55 | 28/1 |
| | (b) | 24.3 | 0.7 | 2.0 | 1.42 | 35/1 |
| Example II | (a) | 38.1 | 1.8 | 5.6 | 1.55 | 21/1 |
| | (b) | 29.3 | 1.1 | 3.4 | 1.53 | 26.6/1 |
| Example III | (a) | 23.0 | 0.6 | 1.8 | 1.25 | 38/1 |
| | (b) | 18.3 | 0.6 | 1.4 | 1.24 | 30.5/1 |
| Example IV | (a) | 34.6 | 1.2 | 4.2 | 1.61 | 29.1/1 |
| | (b) | 22.7 | 0.7 | 2.0 | 1.39 | 32.4/1 |

(a) 95% air, 5% H$_2$O—10 hrs.—1,400° F.
(b) 100% H$_2$O—4 hrs.—1,250° F.

The excellent gasoline/coke and gasoline/gas ratios displayed by these catalysts at the indicated activity levels renders these of particular advantage for use in cracking of oils characteristically yielding comparatively large quantities of coke, for instance certain heavy petroleum stocks such as those having a 90% boiling point above 800° F. and a mid-boiling point above 650° F.

The catalyst of Example I after treatment with steam for 4 hours at 1250° F. (CAT-A activity 24.3% gasoline) was employed in cracking a heavy gas oil; an East Texas gas oil fraction of 29.0° API gravity and boiling over the range (VA) of 530° F. initial to 95% at 930° F. (50% at 746° F., 90% at 889° F.). The gas oil was cracked at an average bed temperature of 875° F., at a space rate of 1 (vol. liquid charge/per vol. catalyst/per hr.) under a pressure of 10 pounds per square inch gauge, 10% by weight of steam being added to the charge, over an on-stream operating period of ten minutes. The yields obtained are shown in Table 2 below.

The same gas oil as above was also cracked with other catalysts of the examples, heat treated as indicated, obtaining yields shown in Table 2.

Table 2

| Catalyst | Heat treat | Yields | | | | | |
|---|---|---|---|---|---|---|---|
| | | Liquid recovery | Conversion | Gaso. | Coke | Gas | Gas Grav. |
| | | Volume percent | Volume percent | Volume percent | Weight percent | Weight percent | |
| Example I | 1250° F., 4 hrs., 100% $H_2O$ | 98.3 | 39.7 | 37.9 | 1.2 | 6.4 | 1.50 |
| Example II | 1400° F., 10 hrs., 5% $H_2O$ | 89.8 | 60.0 | 49.8 | 3.4 | 14.0 | 1.55 |
| Example III | 1400° F., 10 hrs., 5% $H_2O$ | 96.9 | 39.0 | 35.9 | 1.5 | 6.9 | 1.40 |
| Example V | 1400° F., 10 hrs., 5% $H_2O$ | 97.2 | 43.8 | 41.0 | 1.6 | 8.1 | 1.48 |
| Example VI | 1400° F., 10 hrs., 5% $H_2O$ | 96.2 | 45.6 | 41.8 | 1.6 | 8.9 | 1.37 |

It will be noted that the catalyst of Example I gave a gasoline/coke ratio of over 31, and even at the high degree of conversion with the more active catalyst of Example II (CAT-A=38.1% gaso.) the quantity of coke and gas formed is surprisingly low; typical commercial synthetic silica-alumina gel catalyst at substantially the same conversion level with this charge stock will produce in the order of about 5% by weight coke and about 20% by weight gas.

EXAMPLE VII

A solution of commercial zirconium sulfate (zircotan) was employed containing per liter of solution 141.3 grams of $ZrO_2$ and 402 grams $SO_4$. To a quantity of this solution furnishing 50 parts by weight $ZrO_2$ there was added 75.8 parts by weight commercial concentrated sulfuric acid (95% $H_2SO_4$), and to the admixed solutions there was added 1,585 parts by weight of commercial water glass, "N-Brand," of 1.40 specific gravity, providing 450 parts by weight $SiO_2$, giving a ratio of $9SiO_2/1ZrO_2$. These proportions resulted in the production of a slurry having a product concentration of $ZrO_2$ plus $SiO_2$ of 328 grams per liter of slurry.

This slurry, which was found to have a pH of 2.5, was then adjusted to pH 5 by addition of concentrated ammonium hydroxide and the resulting product then thoroughly incorporated in a wet mill to form a homogeneous pasty mass. The milled mass was easily filtered, then washed with water until sulfate free, then with dilute ammonium chloride solution for removal of alkali metal ions, and finally again with water until chloride free. The wash liquor drained readily. The obtained purified grainy paste was cast into 4 mm. pellets and the pellets dried.

The dried pellets were treated for ten hours at 1400° F. in air containing 5% steam, then used in cracking a light gas oil, under conditions of the "CAT-A" method. There was obtained from the oil charged yields of 35.5% by volume gasoline with 1.5% by weight coke and 3.5% by weight gas of 1.43 specific gravity. The ratio of gasoline/coke obtained is 23.7/1.

The catalysts of the invention can be employed in cracking of light or heavy hydrocarbons as well as in the catalytic treatment of gasoline and naphthas under cracking conditions to improve their quality (reforming). In systems employing a fixed catalyst bed or moving solid bed of catalyst, the catalyst is advantageously employed in the form of aggregates such as pellets, coarse granules, tablets or the like, and the greater facility of forming such aggregates from precipitates prepared in accordance with the invention is one of the important advantages obtained. For use in other known systems of hydrocarbon conversion, as where the catalyst is suspended in a fluid medium, smaller particles or more finely divided catalyst is preferred, in which event the forming or casting step need not be practiced and the precipitated product may be broken up or ground to desired size and then dried; or larger dried aggregates can be comminuted to required size.

In the use of the catalysts according to the present invention no change in usual conditions of treatment of the hydrocarbon to be processed is rendered necessary. The usual conditions as to time, temperature, etc. can be followed if desired. As an example of a fixed bed operation, cracking may be carried out at a temperature of 800° F. to 950° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 8, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In the processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

Obviously many modifications and variations of the invention as hereinbefore set forth may be made without departing from the spirit and scope thereof and, therefore, only such limitations should be imposed as are indicated in the appended claims.

Hydrocarbon conversion processes employing catalyst prepared by methods of the present invention are claimed in my companion application Serial No. 794,128 filed of even date with the present application.

I claim as my invention:

1. The method of preparing active siliceous plural oxide catalysts, which comprises reacting in high concentrations and in the absence of large quantities of liquid reaction medium, a silicate and a compound of a metal whose oxide is catalytically active, to produce a granular non-gelatinous precipitate of silica and said metal oxide, the concentration of said silicate and said compound of the metal being such as to furnish not less than 150 grams of their oxides per liter of total reaction mass with silica predominating.

2. The process of preparing active siliceous plural oxide catalysts, which comprises reacting in aqueous media an alkali metal silicate and a salt of a metal whose oxide is catalytically active, in the presence of an acid reacting compound in an amount sufficient to provide a reaction mass of pH 2 to 10, said alkali metal silicate and said salt of the metal being present in the reaction mass in high concentration furnishing silica and such catalytically active metal oxide in a product concentration of at least 150 grams per liter of total reaction mass with silica predominating, whereby a granular non-gelatinous precipitate is formed.

3. The method of preparing synthetic catalyst comprising silica and alumina, which comprises reacting an alkali metal silicate in excess with a water soluble aluminum compound in the presence of added acidic material and in a small amount of aqueous reaction medium at a pH of 4–9 and a product concentration of $SiO_2.Al_2O_3$ in the reaction medium of at least 150 grams per liter, thereby producing a granular non-gelatinous precipitate, purifying the precipitate by washing, and drying the precipitate.

4. The method of preparing synthetic catalyst comprising silica and alumina in the form of molded aggregates, which comprises reacting an alkali metal silicate and a water soluble aluminum compound in a small amount of aqueous reaction medium at a product concentration of $SiO_2$ and $Al_2O_3$ of at least 150 grams per liter in the reaction medium, said reaction being effected in the presence of an added acidic agent in quantity sufficient to provide a pH of 4–9, thereby producing a granular non-gelatinous precipitate, washing the precipitate, adjusting the water content thereof to produce a paste of moldable consistency, forming said paste into aggregates of desired shape and size, and drying said aggregates.

5. The method of preparing active contact masses which comprises thoroughly admixing in a small quantity of liquid medium an alkali metal silicate and a salt of an amphoteric metal whose oxide is catalytically active, said alkali metal silicate and said salt being present in concentrations in said liquid medium such that the $SiO_2$ is in excess of said catalytically active metal oxide and the content of $SiO_2$ and said oxide constitutes at least 150 grams per liter of the total reaction mass, adjusting the hydrogen ion concentration of the reaction mass to within the range of 4 to 9 pH, thereby forming a granular precipitate comprising silica and said catalytically active oxide, washing the granular precipitate in aqueous media to remove soluble salts and base exchangeable alkali metal ions, extruding the precipitate into pieces of desired size and shape, and drying said pieces.

6. The process of preparing synthetic catalysts comprising silica and alumina, said catalysts having more heterogeneous surface than catalysts of the gel type; comprising the step of simultaneously precipitating silica and alumina from soluble compounds of silicon and aluminum present in an aqueous medium at least partly in solution therein, said soluble compounds being present in said aqueous medium in such high concentrations as to provide $SiO_2$ and $Al_2O_3$ in a quantity of at least 150 grams per liter of total reaction mass, with $SiO_2$ predominating, whereby the obtained precipitate is substantially granular and is capable of being readily separated from the liquid reaction medium and from aqueous wash liquids, and can be directly extruded to form pellets.

7. The process of claim 6 wherein the soluble compounds of silicon and aluminum are present in the aqueous medium in proportions furnishing 9 parts $SiO_2$ to one part $Al_2O_3$.

8. The process in accordance with claim 6 wherein the product concentration of $SiO_2$ and $Al_2O_3$ in the aqueous slurry is in excess of 250 grams per liter.

9. The process of preparing synthetic catalysts comprising silica and zirconia, said catalysts having more heterogeneous surface than catalysts of the gel type; comprising the step of simultaneously precipitating silica and zirconia from soluble compounds of silicon and zirconium present in an aqueous medium at least partly in solution therein, said soluble compounds being present in said aqueous medium in such high concentrations as to provide $SiO_2$ and $ZrO_2$ in a quantity of at least 150 grams per liter of total reaction mass with $SiO_2$ predominating, whereby the obtained precipitate is substantially granular and is capable of being readily separated from the liquid reaction medium and from aqueous wash liquids, and can be directly extruded to form pellets.

GEORGE R. BOND, Jr.

REFERENCES CITED

The following references are of record in the file of this patent:

UNITED STATES PATENTS

| Number | Name | Date |
|---|---|---|
| Re. 21,690 | Bond | Jan. 14, 1941 |
| 2,165,578 | Rembert | July 11, 1939 |
| 2,280,650 | Kassel | Apr. 21, 1942 |
| 2,289,918 | Lee et al. | July 14, 1942 |
| 2,429,981 | Bates | Nov. 4, 1947 |
| 2,438,560 | Kanhofer | Mar. 30, 1948 |